United States Patent [19]

Vitellaro

[11] 4,294,636
[45] Oct. 13, 1981

[54] METHOD AND APPARATUS FOR MAKING WIRE REINFORCED HOSE

[75] Inventor: Frank A. Vitellaro, Trenton, N.J.

[73] Assignee: Dayco Corporation, Dayton, Ohio

[21] Appl. No.: 167,293

[22] Filed: Jul. 10, 1980

[51] Int. Cl.³ .............................. B65H 81/00
[52] U.S. Cl. .......................... 156/143; 156/195; 156/244.13; 156/429
[58] Field of Search .......... 156/143, 195, 191, 244.11, 156/244.13, 244.15, 244.24, 428, 429, 500, 431, 272

[56] References Cited

U.S. PATENT DOCUMENTS

| | | | |
|---|---|---|---|
| 2,625,979 | 1/1953 | Harris et al. | 156/431 |
| 2,640,796 | 6/1953 | Langer | 156/272 |
| 3,477,891 | 11/1969 | Howerkamp | 156/195 |
| 3,536,559 | 10/1970 | Pelley et al. | 156/429 |

FOREIGN PATENT DOCUMENTS 833054  4/1960  United Kingdom ................ 156/143

Primary Examiner—Michael W. Ball
Attorney, Agent, or Firm—Charles E. Bricker

[57] ABSTRACT

A method and apparatus for continuously forming a reinforced, flexible duct or hose. The apparatus comprises an extruder for forming an elongated, flat strip of a polymeric material, a strip shaping means for shaping the flat strip to define a profiled strip, means for helically winding the profiled strip with adjoining turns having portions in overlapping relation, means for disposing a reinforcing wire in sandwiched relation between the overlapped strip portions, and means for bonding the overlapping portions.

The method comprises the steps of extruding a continuous flat strip of a polymeric material, forming the flat strip to define a profiled strip, helically winding the profiled strip with overlapping adjoining turns, disposing a reinforcing wire in sanwiched relation between the overlapping portions, and bonding together the overlapping portions.

12 Claims, 10 Drawing Figures

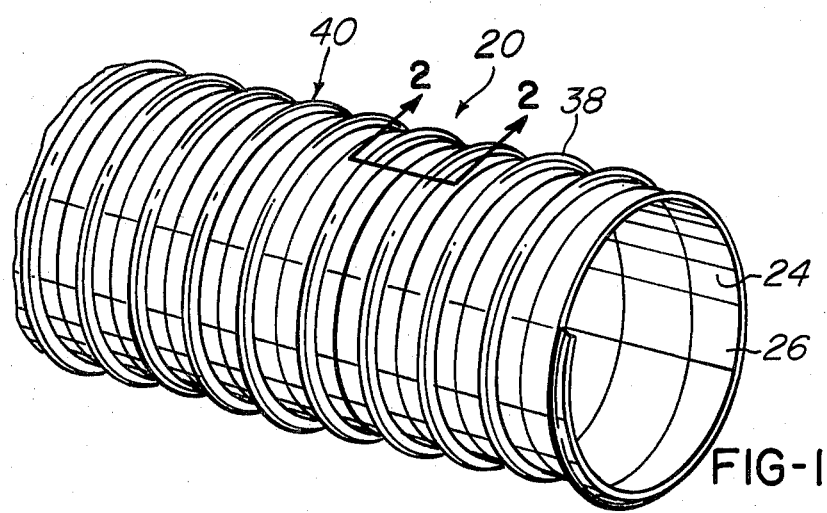
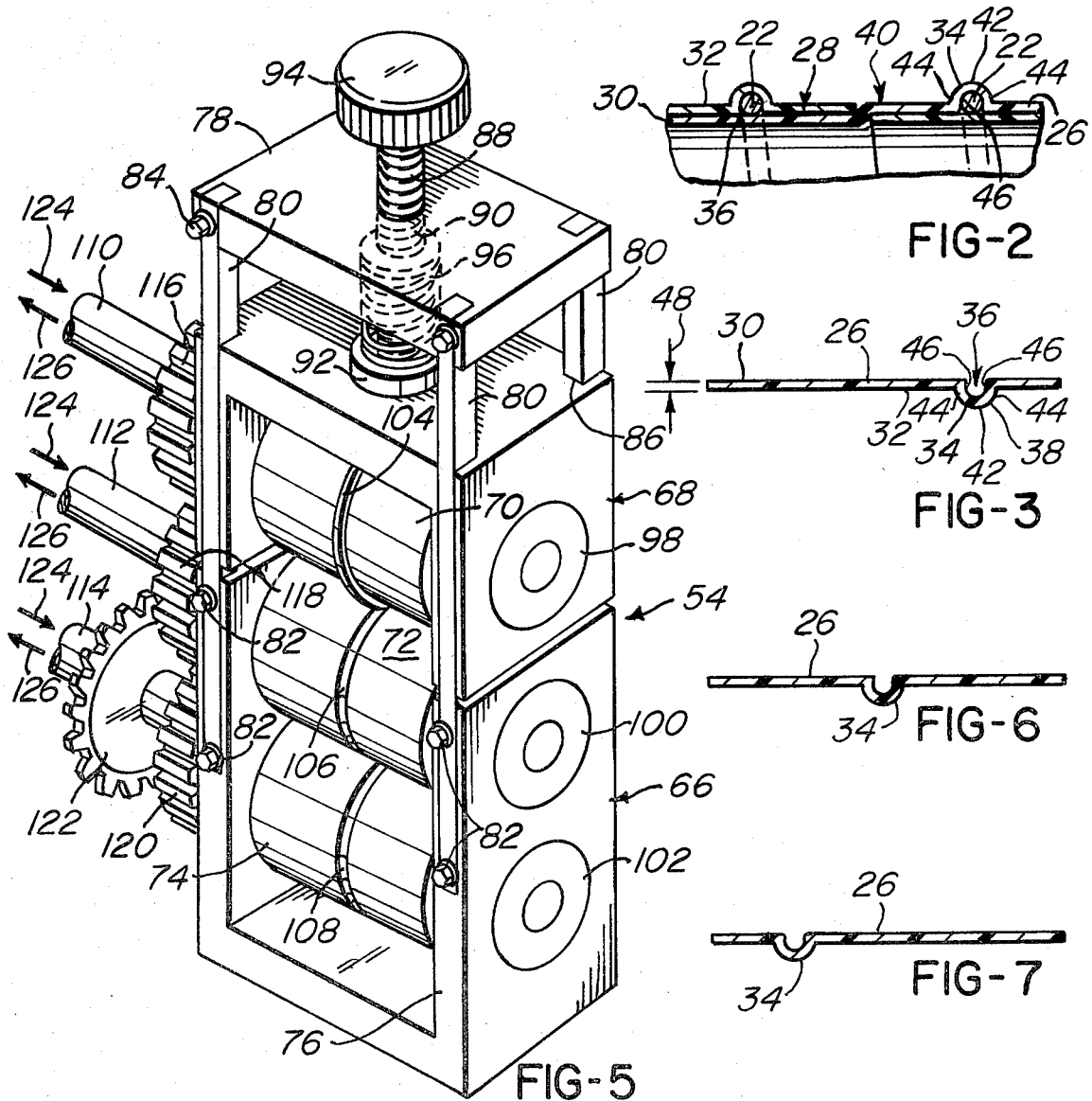

METHOD AND APPARATUS FOR MAKING WIRE REINFORCED HOSE

BACKGROUND OF THE INVENTION

This invention relates to a method and apparatus for continuously forming a reinforced flexible polymeric hose.

A substantial number of methods are known in the prior art for continuously forming reinforced flexible hose from a continuous, flexible tape and a continuous, spring wire. Examples of such a hose and methods for making the same are disclosed in U.S. Pat. Nos. 2,539,853, 3,219,738, 3,336,172 and 3,739,815. In each of these patents, it appears that a flat strip or tape of pliable material is wound against a reinforcing wire while the wire is supported on a support. With such a flat strip, there is generally some relative movement between the strip and the wire during manufacture whereby the wire is not generally wound with optimum precision, whereby the overall quality of the resulting hose is decreased. Additionally, with the hoses disclosed in each of these patents there is a tendency for separation and relative movement between the strip and wire, often resulting in premature weakening and failure of the hose.

In an apparent effort to more accurately position and secure the reinforcing wire, several U.S. patents disclose wrapping the flat strip around the reinforcing wire prior to winding the same to form hose. This wrapping step is disclosed for example in U.S. Pat. Nos. 2,759,521, 3,325,327, 4,012,272 and 4,149,924.

It is also known to make hose utilizing a helically-wound wire and a preformed, profiled tape. One example of such a tape is disclosed in U.S. Pat. No. 3,089,535. This tape has a roughly M-shaped cross-sectional configuration, which is helically wrapped around the wire. With this hose, the helical convolutions defined in the hose are inherently double thickness convolutions which result in excessive use of material, and the inside surface of the resulting hose has a comparatively rough corrugated shape with the helically coiled wire exposed.

Another example of a preformed, profiled tape is disclosed in U.S. Pat. No. 4,203,476. This type has a flat side portion adjoined by a convoluted side portion having an integral preformed convolution therein. The convolution defines a groove relative to one surface; as the hose is formed the reinforcing wire is disposed in this groove. With this hose, a number of different profiled extruder dies may be required, for example, to provide different tape thicknesses and/or profiles.

It is therefore an object of the present invention to provide a novel method for making a reinforced flexible polymeric hose.

It is another object of this invention to provide a novel apparatus for making such a hose.

Other objects, aspects and advantages of the present invention will be apparent to those skilled in the art from a reading of the following disclosure.

SUMMARY OF THE INVENTION

In accordance with the present invention there is provided a novel method for making a reinforced, flexible polymeric hose which comprises the steps of extruding a continuous flat strip of polymeric material of desired width and thickness, forming the flat strip to define a profiled strip having a flat side portion and a convoluted portion, helically winding the profiled strip with adjoining turns in overlapping relation, disposing a reinforcing wire in sandwiched relation between the overlapping portions during the helical winding step, and bonding together the overlapping portions.

Also provided in accordance with the present invention is an apparatus for forming a reinforced, flexible polymeric hose which comprises means for forming an elongated flat polymeric strip, means for forming the flat strip to define a profiled strip having a flat side portion and a convoluted side portion, means for halically winding the profiled strip with adjoining turns having portions in overlapping relation, means for disposing a reinforcing wire in sandwiched relation between the overlapped portions during the helical winding step, and means for bonding the overlapping portions.

BRIEF DESCRIPTION OF THE DRAWINGS

In the drawings,

FIG. 1 is a perspective view of a portion of a hose formed in accordance with this invention;

FIG. 2 is a section taken along lines 2—2 of FIG. 1;

FIG. 3 is a cross-sectional view of the profiled strip employed to make the hose illustrated in FIG. 1;

FIG. 5 is a perspective view illustrating the apparatus employed to convert the flat extruded polymeric strip into a profiled strip;

FIGS. 6 and 7 are cross-sectional views illustrating that the position of the convoluted portion of the profiled strip can be easily shifted;

DETAILED DESCRIPTION OF THE DRAWINGS

Figure 4:
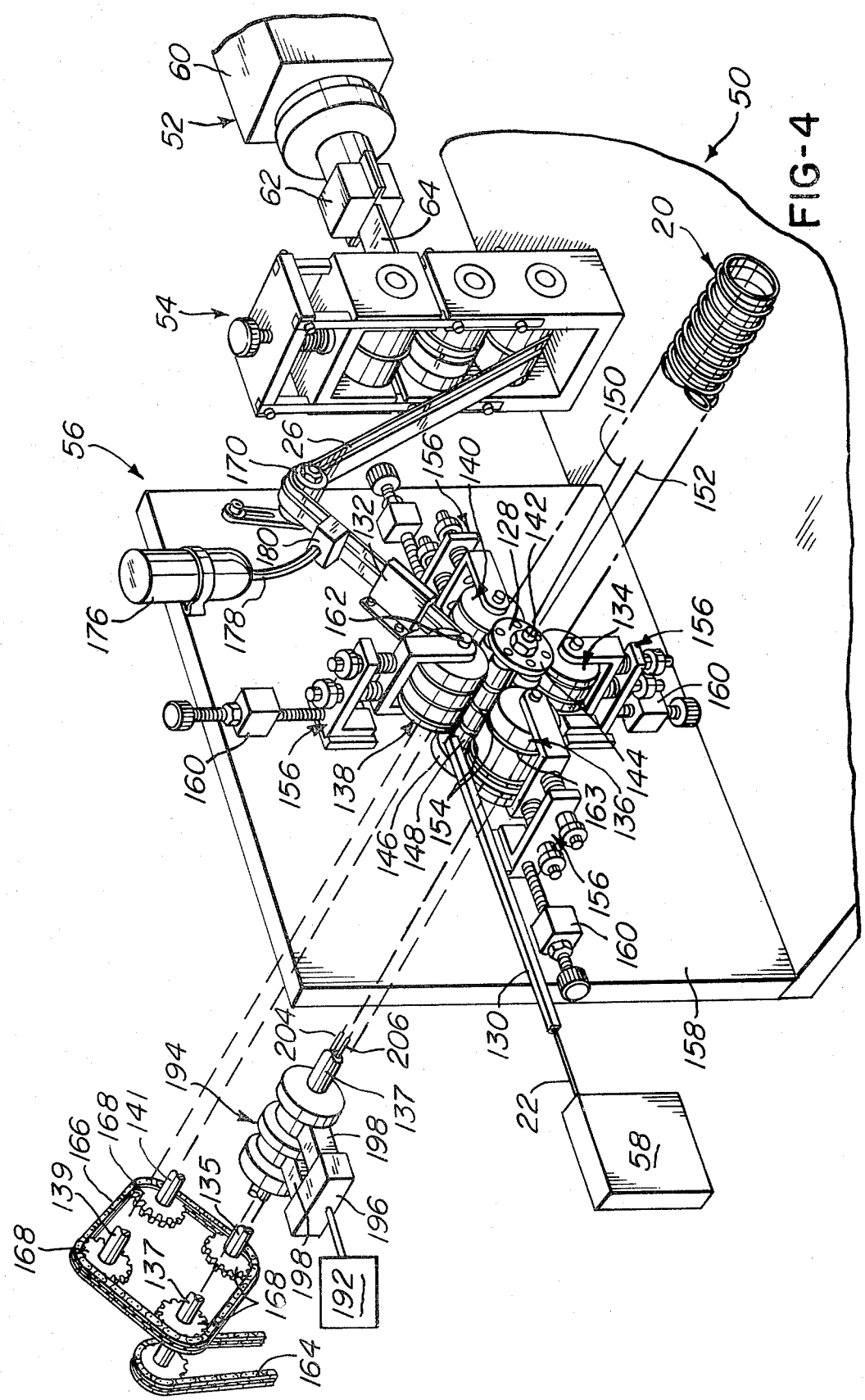
FIG. 4 is a perspective view illustrating the apparatus of this invention.

Reference is now made to FIGS. 1 and 2 of the drawings which illustrate one exemplary embodiment of a wire-reinforced hose construction or hose of this invention which is designated generally by the reference numeral 20. The hose 20 has optimum flexibility, yet has considerable strength due to the wire-reinforcement which is provided by a helically wound reinforcing wire 22. The hose 20 has a substantially smooth tubular inside surface 24.

The hose 20 is defined by a helically wound strip 26 of pliable material which has adjoining turns thereof with portions in overlapping relation, as indicated at 28 in FIG. 2. These overlapping portions 28 have the reinforcing wire 22 sandwiched therebetween.

Referring to FIG. 3, the strip 26 has a flat inside portion 30 which, in the exemplary hose 20 of FIG. 1, defines a major part of the width of strip 26. Strip 26 has a convoluted side portion 32, which has an integral preformed convolution 34 defined therein with the convolution defining a groove 36 relative to one surface of the strip, i.e., the surface defining the inside surface 24 of hose 20. The convolution 34 defines a bead 38 relative to the opposite surface of strip 26, i.e., the surface defining the outside surface of hose 20, such outside surface being designated generally by the reference numeral 40.

The preformed convolution 34 has a roughly U-shaped cross-sectional configuration defined by a bight 42 and a pair of legs each designated by the same reference numeral 44 extending from opposite ends of the bight 42. The legs 44 have inside surfaces 46 which engage the wire 22 and hold the wire in a precise helical path once the strip 26 is helically wound with the wire 22.

The strip 26 is made of a polymeric material, preferably a thermoplastic polymer, or copolymer, such as, for example, ABS, polybutylene, EPDM, polypropylene, butadiene-styrene copolymers, polyurethane, polyvinyls and vinyl copolymers, and the like, including blends thereof. A presently preferred polymeric material is polyvinyl chloride. The strip 26 preferably has a uniform thickness 48 throughout its entire width including flat side portion 30 and convoluted side portion 32.

It will be readily apparent from FIGS. 1 and 2 that wire 22 is disposed in the groove 36 with the strip 26 in its helically wound relation, with the bead 38 defining an integral helical bead along the hose 20, and in particular, along the axial length of such hose. The portions of strip 26 in overlapping relation, as indicated at 28 in FIG. 2, are defined by the convoluted side portion 32 disposed in wound relation against the flat side portion 30, with the wire 22 sandwiched therebetween and disposed in the groove 36. It is seen that hose 20 has a substantially smooth tubular inside surface 24 which is defined solely by adjoining turns of the flat side portion 30.

The hose 20 is made using the apparatus and method hereinafter described. Turning now to FIG. 4, the apparatus of this invention is indicated generally by the reference numeral 50 and comprises an extruder means 52, a strip shaping means 54, a hose-fabricating means 56 and a wire-feeding means 58. Motors and electrical controls and the like, are not shown, and do not form a part of the present invention, but the need for the same will be readily apparent to those skilled in the art.

The extruder means 52 comprises a conventional extruder 60 having a ribbon-forming die 62 which extrudes a continuous length of polymeric ribbon 64 having a desired thickness and width.

The ribbon 64 is passed to the strip shaping means 54, shown in greater detail in FIG. 5, which shapes the flat ribbon 64 into the strip 26, such as that illustrated in FIG. 3.

The strip shaping means 54 comprises a first frame assembly 66 and a second frame assembly 68, at least two shaping rollers 70 and 72, and preferably a third roller 74, means for adjusting the second frame assembly 68 relative to the first assembly 66, means for rotatably driving the rollers, and means for cooling the rollers.

The first frame assembly 66 comprises a generally U-shaped lower frame member 76, a plate 78 and a plurality of support members, each designated by the same reference numeral 80. The support members 80 are secured at one end to the lower frame member 76, as at 82, and at their other end to the plate 78, as at 84, thereby maintaining the plate 78 at a predetermined distance from the lower frame member 76.

The second frame assembly 68 is a generally inverted U-shaped member having a plurality of passages, each designated generally by the reference numeral 86, which mate with the support members 80. The passages 86, together with support members 80, maintain front-to-rear and side-to-side alignment of the second frame assembly 68 with the lower frame member 76 of the first frame assembly 66, yet allow slidable upward and downward movement of the second frame assembly relative to the first frame assembly.

The adjusting means comprises a threaded rod 88 which passes through a threaded hole 90 in the plate 78. One end of the rod 88 is rotatably secured to the second frame assembly by a coupling 92, and the opposite end of the rod 88 is provided with a knob 94. A spring 96 is interposed around the rod 88 between the plate 78 and the second frame assembly 68 to urge the second frame assembly 68 toward the lower frame member 76.

The second frame assembly 68 is journaled to accept the roller 70 mounted in bearings 98. The lower frame assembly is likewise journaled to accept the rollers 72 and 74 mounted in bearings 100 and 102, respectively.

Each of the rollers 70, 72 and 74 is a generally right circular cylinder. The roller 70 has a circumferential ridge 104 extending therearound. The roller 72 has a circumferential groove 106, which mates with the ridge 104 on the roller 70, but has a slightly different cross-sectional shape, as hereinafter explained. The roller 74 may likewise be grooved, as at 108, or it may be plain.

Each of the rollers 70, 72 and 74 is hollow and each has a hollow shaft, designated by the reference numerals 110, 112 and 114, respectively, extending outwardly to one side, beyond the respective frame assemblies. Each of the shafts 110, 112 and 114 is provided with a gear 116, 118 and 120, respectively, for driving the rollers in unison. The shaft 114 is further provided with a sprocket 122 for driving the shaft by way of a motor and chain, neither of which is shown.

Each of the rollers is cooled by water, or another suitable cooling fluid. The cooling fluid is passed into the roller through its associated hollow shaft, as indicated by the arrows 124 and withdrawn therefrom as indicated by the arrows 126, through suitable rotary couplings, not shown.

It should now be readily apparent that the thickness 48 of the strip 26 is determined by the distance between the rollers 70 and 72, that the groove 36 is formed by the ridge 104 on the roller 70 and the convolution 34 is formed by the groove 106 in roller 72. It should also be readily apparent that the dimensions of the ridge 104 should be commensurate with the size of the wire 22, i.e., the height and width of the ridge 104 should be at least approximately equal to the diameter of the wire 22; and that the dimensions of the groove 106 should be commensurate with the wire 22 diameter plus allowances for the expected thickness 48 of the strip 26.

The convolution 34 may be located to one side of the strip 26, as illustrated in FIG. 3, at the midpoint of the strip 26, as illustrated in FIG. 6, or to the opposite side of the strip 26, as illustrated in FIG. 7. The desired positioning of the convolution 34 can be accomplished by shifting the position of the apparatus 54 in the direction of the rotational axes of the rollers 70, 72 and 74.

The shaped strip 26 is passed to the hose fabricating apparatus 56. Referring again to FIG. 4, the apparatus 56 comprises a stub mandrel 128, means 130 for continuously leading the reinforcing wire onto the mandrel 128, guide means 132 for continuously passing the strip 26 onto the mandrel 128, and exterior driving rollers 134, 136, 138 and 140 for frictionally driving the strip 26 in its helical direction of movement and causing the strip to wrap helically around the mandrel with successive turns thereof mutually overlapping to form the hose 20.

The stub mandrel 128 is described in greater detail in U.S. Pat. No. 2,625,979, issued Jan. 20, 1953, to E. P. Harris et al, which is incorporated herein by reference. Briefly, the stub mandrel 128 comprises a central stationary bar 142 upon which is mounted two annular roller supports 144 and 146, both secured to the bar 142 by suitable means. A series of mandrel rollers 148 are rotatably mounted between the supports 144 and 146. The rollers 148 are evenly spaced peripherally around the longitudinal axis 150 of the bar 142 and the longitudinal centers of the rollers 148 are equidistant from the axis 150. The rollers 148 are so mounted that the axis 152 of each roller 148 is inclined at the pitch angle of the helix of the hose 20, for example, about 3-4 degrees, to a radial plane passing through the axis 150 and intersecting the roller axis 152 at its center.

The rollers 148 each have several peripheral grooves 154 therein of such depth and relative locations on the different rollers 148 as to positively guide a continuous length of reinforcing wire 22 into the desired helical form when the wire is wrapped around the mandrel 128. The grooves 154 each extends in a direct peripheral direction around its inclined roller 148; hence the rotation of the inclined rollers 148 on their own axes will not change the position of any groove 154 at the tangential point where the outermost surfaces of the rollers 148 lie in an imaginary cylindrical surface concentric with the axis 150. The rollers 148 each have their grooves 154 differently located along the lengths thereof so that taken together, the grooves outline a helical path along the imaginary cylindrical surface.

The exterior driving rollers 134, 136, 138 and 140 are suitably mounted on forked brackets, each designated by the same reference numeral 156 which are adjustably mounted to the stationary base 158 by a suitable mounting means 160. The pivot shaft 162 of each of the four driving rollers 134, 136, 138 and 140 extends parallel to the axis 152 of the particular roller 148 against which the driving roller presses in each case. These driving rollers each have several peripheral grooves 163 at relative locations corresponding to the locations of the grooves 158 on the rollers 148 against which the driving rollers press in each case.

The driving rollers 134, 136, 138 and 140 are all driven at the same constant speed by any suitable means. The roller 136 is shown as being driven by a spricket chain 164 leading from a suitable power source, not shown. The four rollers 134, 136, 138 and 140 are geared together by a suitable endless sprocket chain 166 extending around identical sprocket wheels 168 fixed to the shafts 135, 137, 139 and 141 of the rollers 134, 136, 138 and 140, respectively.

In operation, the shaped strip 26 is continuously fed over a guide roller 170 which is suitably mounted to the base 158, then over the drive roller 140 onto the rollers 148 of the mandrel 128. The strip 26 is fed onto the mandrel rollers 148 at the pitch angle of the helix to be formed, which is equal to the above-described angle of inclination of the rollers 148. As the strip 26 passes progressively around mandrel 128, it passes over each roller 148 at this same pitch angle of the helix into which the strip is being wrapped. The width of the strip 26 is such that adjacent turns thereof overlap one another the desired amount to give the desired overlapping helically wrapped hose structure 20, shown in FIG. 1.

The reinforcing wire 22 is fed from a conventional feeding and tensioning means 58 through wire guide 130 to the mandrel 128. The wire 22 is guided into the aforesaid helical path by the grooves 154 and 163, and then into the groove 36 in the strip 26. In continuous operation, helical winding of the strip 26 about the mandrel 128 causes the convoluted side portion 32 to overlap the next previous winding of the flat side portion 30, and during this helical winding step, the wire 22 is disposed in the groove 36.

In order to provide an integral hose structure, the adjoining turns of the strip 26 which are disposed in overlapping relation, as at 28, must be joined together. These adjoining turns may be joined together by applying a suitable adhesive. Suitable adhesives include nitrile rubber-based adhesives, urethanes, polyvinyl acetate, acrylics, hot melt copolymers, epoxies, cyanoacrylate, reactive acrylate monomers, polyester and resin emulsions. The adjoining turns may also be joined by applying a suitable solvent to at least a portion of the strip 26 prior to helically winding the same. As an example, a suitable solvent may be applied by passing the same from solvent reservoir 176 by way of tubing 178 to an application means 180. Those skilled in the art will be aware of solvents suitable for joining adjoining turns of the strip 26, but, as an example, methyl ethyl ketone may be employed for a strip 26 made of polyvinyl chloride.

Figure 8:
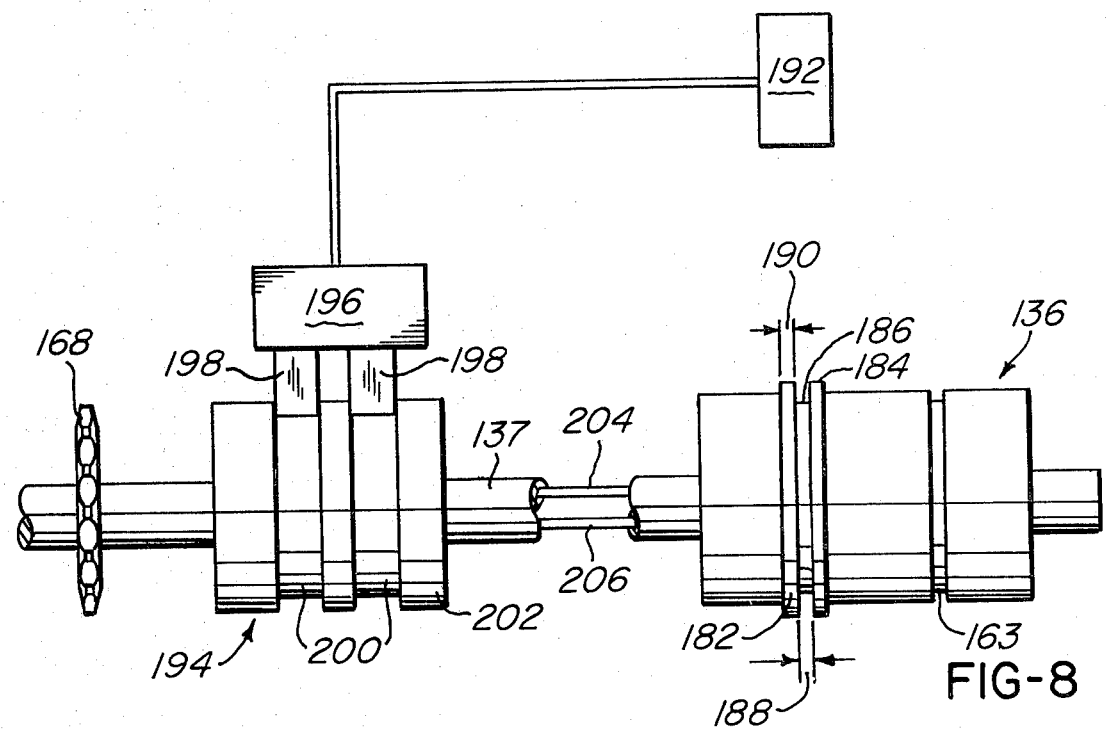
FIG. 8 is a plan view of a dielectric sealing roller utilized for bonding overlapping portions of the profiled strip.

In a preferred embodiment, the adjoining turns of the strip 26 are joined together by dielectric sealing. In order to accomplish this embodiment, it is necessary to replace one of the driving rollers with a dielectric sealing roller, as illustrated in FIG. 4, which illustrates the roller 136 as being a dielectric roller. This roller is illustrated in greater detail in FIG. 8, the base 158 and the forked bracket 156 being omitted for the purpose of clarity. The dielectric roller 136 has a pair of commutator rings 182 and 184 and a groove 186 therebetween. The groove 188 has a width 188 which is at least equal to the width of the bead 38 (FIGS. 1 and 3) and each of the rings 182 and 184 has a width 190 which, preferably, is at least equal to the groove width 188, but may be greater. The roller 136 also has at least one groove 163. The roller 136 is preferably made of an insulating material.

Radio frequency energy is provided to the roller 136 by radio frequency generator 192 (FIG. 4) through a slip ring assembly 194 which comprises a brush holder 196, a pair of brushes 198, and slip rings 200 mounted upon the shaft 137 by way of insulator 202. The RF energy is transferred from the slip rings 200 to the commutator rings 182 and 184 by the wires 204 and 206 which are housed within the shaft 137.

The RF generator 192 (FIG. 4) is a commercially available unit, capable of providing the desired radio frequency energy on a continuous basis at a desired voltage level. The voltage level and frequency employed in the practice of this invention will vary according to the material used in making the strip 26 and the thickness 48 of the strip 26.

The wire 22 may be any suitable metal wire, or it may be made of a suitable plastic material, such as nylon, polypropylene or the like.

Figure 9:
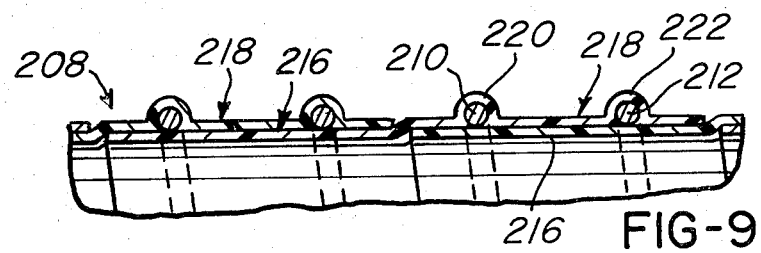
FIG. 9 is a cross-sectional view, similar to FIG. 2, of another embodiment of a hose made according to this invention.

FIG. 9 illustrates a section through another embodiment of a hose which may be made according to this invention. The hose section, designated generally by the reference numeral 208, shown in FIG. 9 is similar to the embodiment shown in FIG. 2, but differs therefrom in that the hose 208 has two reinforcing wires 210 and 212, rather than a single wire 22.

Figure 10:
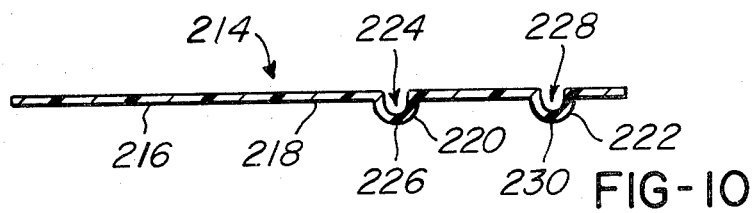
FIG. 10 is a cross-sectional view of the profiled strip employed to make the hose illustrated in FIG. 9.

The hose 208 is comprised of a helically wound strip 214 of pliable material, such strip being shown in detail in FIG. 10. The strip 214 has a flat side portion 216 and a convoluted side portion 218 which has integral preformed convolutions 220 and 222 therein. Convolution 220 defines a first groove 224 relative to one surface of the strip 214 and a first bead 226 relative to the opposite surface of the strip, and convolution 222 defines a similar second groove 228 and second bead 230.

The hose 208 has wire 210 disposed within groove 224 and wire 212 disposed within the groove 228. The hose 208 is made in a similar manner as the hose 20, employing virtually the same apparatus. In order to make the hose 208 it is necessary to modify the strip shaping means 54 by adding another, spaced apart circumferential ridge 104 to the roller 70 and incorporating a corresponding groove 106 into the roller 72. It is also necessary to modify the hose fabricating apparatus 56 by adding another wire guide means 130 and another wire feeding and tensioning means 172. Other minor modifications will be apparent to those skilled in the art.

Various other modifications are possible within the scope of this disclosure without departing from the spirit and scope thereof.

I claim:

1. A method for producing a reinforced flexible polymeric hose which comprises the steps of extruding a continuous flat strip of polymeric material, forming said flat strip to define a profiled strip having a flat side portion and a convoluted portion by continuously passing said flat strip between two profiled rollers to thereby define the desired strip profile with the convoluted side portion, and thereafter helically winding said profiled strip with adjoining turns in overlapping relation, disposing a reinforcing wire in said convoluted side portion in sandwiched relation between the overlapping portions during said helical winding step, and bonding together the overlapping portions.

2. The method of claim 1 wherein said flat strip is passed between a first roller having a circumferential ridge and a second roller having a corresponding circumferential groove to define a shaped strip having a flat side portion and a convoluted portion, said convoluted portion defining a groove relative to one surface of said strip and a bead relative to the opposite surface of said strip.

3. The method of claim 1 wherein said bonding step comprises dielectric bonding.

4. The method of claim 1 wherein said extruding step comprises extruding a strip of a thermoplastic polymer.

5. The method of claim 4 wherein said polymer is a polyvinyl chloride polymer.

6. The method of claim 5 wherein said profiled strip is bonded together in overlapping portions by dispensing a solvent onto at least a portion of said strip prior to said helical winding step.

7. The method of claim 6 wherein said solvent is methyl ethyl ketone.

8. A flexible hose forming apparatus comprising:
(a) extruder means for forming an elongated flat strip of polymeric material;
(b) means for shaping said flat strip to define a profiled strip having a flat side portion and a convoluted side portion, said strip shaping means comprising at least two spaced profiled rollers having parallel axes of rotation, a first of said rollers having a circumferential ridge and a second of said rollers having a corresponding circumferential groove, said ridge and said groove cooperating to form a convolution in said polymeric strip passing therebetween;
(c) means for helically winding said profiled strip with adjoining turns having portions in overlapping relation;
(d) means for disposing a reinforcing wire in said convoluted side portion in sanwiched relation between said overlapped strip portions; and
(e) means for bonding said overlapping portions.

9. The apparatus of claim 8 wherein the spacing between said first roller and said second roller is variable.

10. The apparatus of claim 8 wherein said helical winding means comprises a stationary base; a stub mandrel mounted upon said base, said stub mandrel comprising a plurality of mandrel rollers rotatably mounted between mounting supports, said mandrel roller being mounted so that the axis of each of said rollers is inclined at an angle of about 3-4 degrees to a radial plane passing through the mandrel axis and intersecting said roller axis at its center; a plurality of driving rollers each bearing against one of said mandrel rollers and each rotatably mounted in a bracket so that the axis of each of said driving rollers is parallel to the axis of the mandrel roller against which said driving roller bears; and means for driving said driving rollers in unison.

11. The apparatus of claim 10 wherein said bonding means comprises a dielectric sealing roller as one of said driving rollers.

12. The apparatus of claim 8 wherein said bonding means comprises means for dispensing a bonding medium onto at least one surface of said profiled strip.

* * * * *